United States Patent
Craig

Patent Number: 5,800,257
Date of Patent: Sep. 1, 1998

[54] SHELL SHOCKER

[76] Inventor: William R. Craig, 2906 Northern Dancer Dr., Churchville, Md. 21028

[21] Appl. No.: 926,693

[22] Filed: Sep. 10, 1997

Related U.S. Application Data

[63] Continuation of Ser. No. 144,013, Dec. 15, 1993.

[51] Int. Cl.$^6$ .................................................. A22C 29/04
[52] U.S. Cl. .......................................... 452/59; 452/1
[58] Field of Search ........................... 452/59, 58, 1, 452/13, 14

[56] References Cited

U.S. PATENT DOCUMENTS

| | | | |
|---|---|---|---|
| 3,070,834 | 1/1963 | Carpenter | 452/13 |
| 3,555,594 | 1/1971 | Groover et al. | 452/58 |
| 3,564,645 | 2/1971 | Brugman | 452/59 |
| 3,702,017 | 11/1972 | Lewis | 452/59 |
| 3,755,855 | 9/1973 | Ouw et al. | 452/13 |

*Primary Examiner*—Willis Little
*Attorney, Agent, or Firm*—H. Jay Spiegel

[57] ABSTRACT

A method and apparatus for the immobilization of live hard shell aquatic crustaceans "hard shell crabs" prior to or during processing. The apparatus includes a nonconductive container containing an electrolyte solution, the quantity of said electrolyte solution being sufficient to submerge a number of live hard shell crabs to be processed; electrodes are positioned in spaced relationship within the container and are at least substantially covered by the electrolyte solution, each of said electrodes including a pair of parallel metal rods projecting vertically from the bottom of the container; and an electric switch contained in a connector box, the switch being electrically connected intermediate the electrodes and an electrical power source for allowing an operator to activate the apparatus. Electrical energy supplied to the electrodes is transferred via the electrolyte solution to the submerged crabs for their immobilization.

17 Claims, 4 Drawing Sheets

SHELL SHOCKER

This application is a continuation of application Ser. No. 08/144,013, filed Dec. 15, 1993.

BACKGROUND OF THE INVENTION

The present invention relates to a method and apparatus for the immobilization of live hard shell aquatic crustaceans "hard shell crabs" prior to or during processing. The crab industry standard has been to "ice" the crabs for approximately 20 minutes per bushel in order to immobilize them prior to steaming. Another method involves sticking live crabs with an ice pick (commonly referred to in the industry as "sticking"), and requires approximately 10 minutes per bushel. The "sticking" method is labor intensive, requiring each crab to be individually handled. This method also allows for much of the crabs' fat to drain away from the body leaving less flavorful meat. No prior electric device utilizing the processing technique of the instant invention has been developed. The device according to this invention differs from other known systems that may serve this purpose by unique but direct application of controlled electric current, specific arrangement of electrodes, and use of an electrolyte solution.

The following prior art is known to Applicant:

U.S. Pat. No. 2,722,036 to Servidio

U.S. Pat. No. 2,879,539 to Cervin

U.S. Pat. No. 3,555,594 to Groover et al.

U.S. Pat. No. 3,702,017 to Lewis

U.S. Pat. No. 3,828,397 to Harben, Jr.

U.S. Pat. No. 3,981,045 to Collins

U.S. Pat. No. 4,726,321 to Malone et al.

U.S. Pat. No. 4,751,767 to Walther.

Each of these U.S. Patents was cited of record during the prosecution of Parent application Ser. No. 08/144,013. These references are only generally related to the teachings of the present invention for the following reasons:

In Servidio, the disclosed container does not retain liquid therein, rather, the container includes perforations allowing all liquid to leak from the container;

In Cervin, Groover et al., Lewis, Harben, Jr., Collins and Walther, there is no immersion of a creature within a tank of water. In Harben, Jr. and Walther, a portion of the head of the animal is immersed in electrolyte, a scenario different from the teachings of the present invention;

In Malone et al., crustaceans only receive a mild, non-disabling shock upon engagement with the disclosed electrodes. By comparison, in the present invention, each and every crustacean immersed within the inventive tank is shocked upon application of electric current.

SUMMARY OF THE INVENTION

The object of the invention is to provide a simple yet durable electronic device that will temporarily or permanently immobilize live crabs. The invention enhances live crab processing while reducing processing damage to the products' operator and equipment.

The inventor is knowledgeable of the crab industry standard to ice live crabs prior to steaming. The icing process is used to immobilize live crabs and the process itself requires a 20 minute icing period per bushel of crabs. The reason for this processing method is to ensure that all of the legs on the crab remain intact with the body during steaming. If live crabs are placed directly into the steamer without first being immobilized, they would be unable to be served whole as their legs would fall away from their bodies.

The present invention (Shell Shocker) utilizes a unique application of controlled electric current, specific arrangement of electrodes and use of an effective electrolyte solution. The "Shell Shocker" provides a time saving and cost effective method to immobilize live crabs before they are steamed. The "Shell Shocker" enables one bushel of live crabs to be immobilized in 30 seconds. This is a time savings of 19 minutes and 30 seconds per bushel in comparison to the old method of using ice. Accordingly, the "Shell Shocker" eliminates the cost involved with the old method of using ice to immobilize live crabs because no ice is necessary. The "Shell Shocker" has been tested on all sizes of crabs and has proven to be an effective method for processing crabs.

Further objects and advantages of this invention will become more apparent from the following description taken in connection with the accompanying drawings wherein is set forth, by way of illustration and example, a preferred embodiment of this invention.

BRIEF DESCRIPTION OF THE DRAWINGS

The present invention will be more fully understood by reference to the following detailed description thereof when read in conjunction with the attached drawings, and wherein.

SPECIFIC DESCRIPTION OF THE PREFERRED EMBODIMENT

Figure 1:
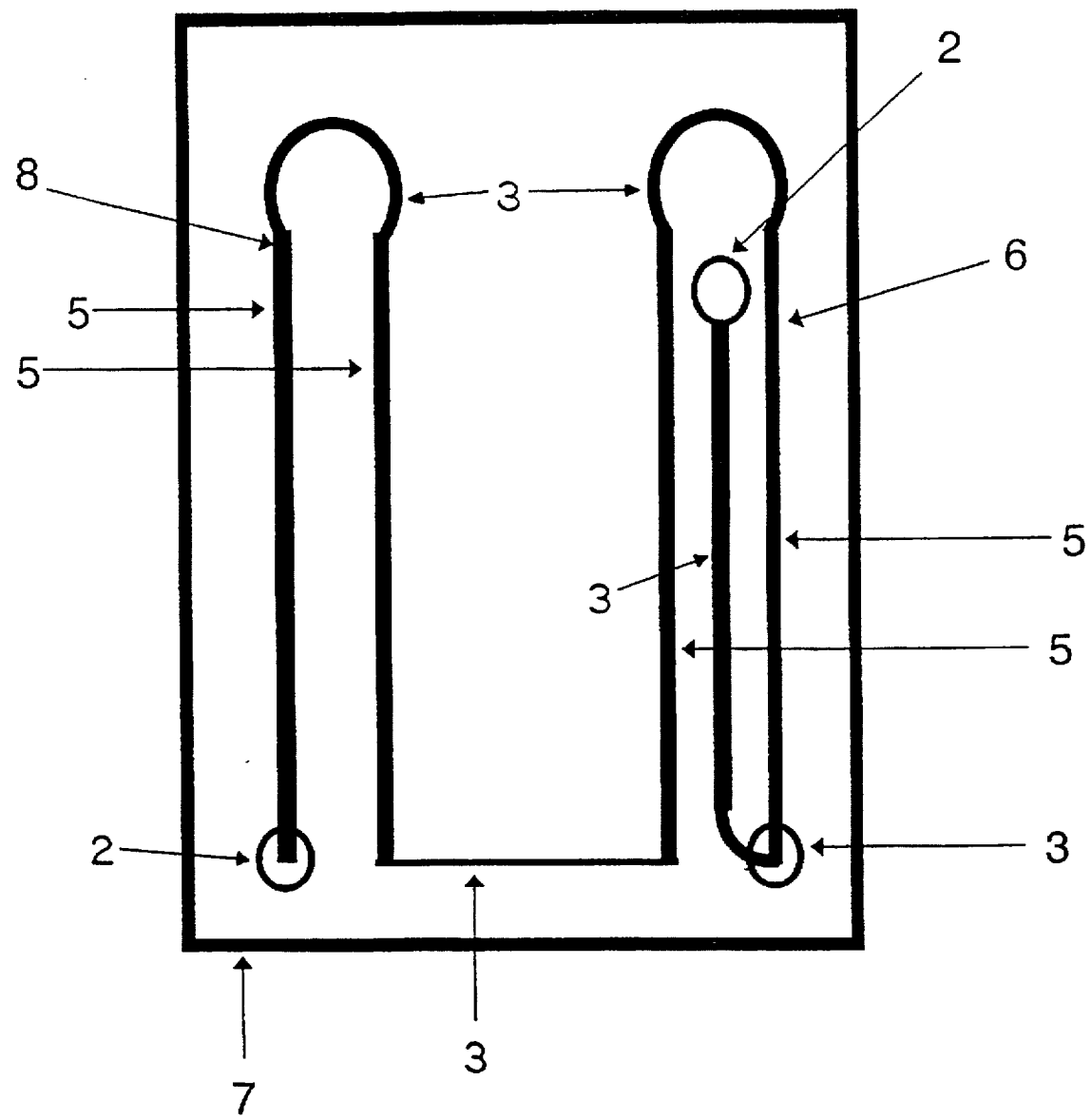
FIG. 1 is a frontal view of the present invention.
Figure 2:
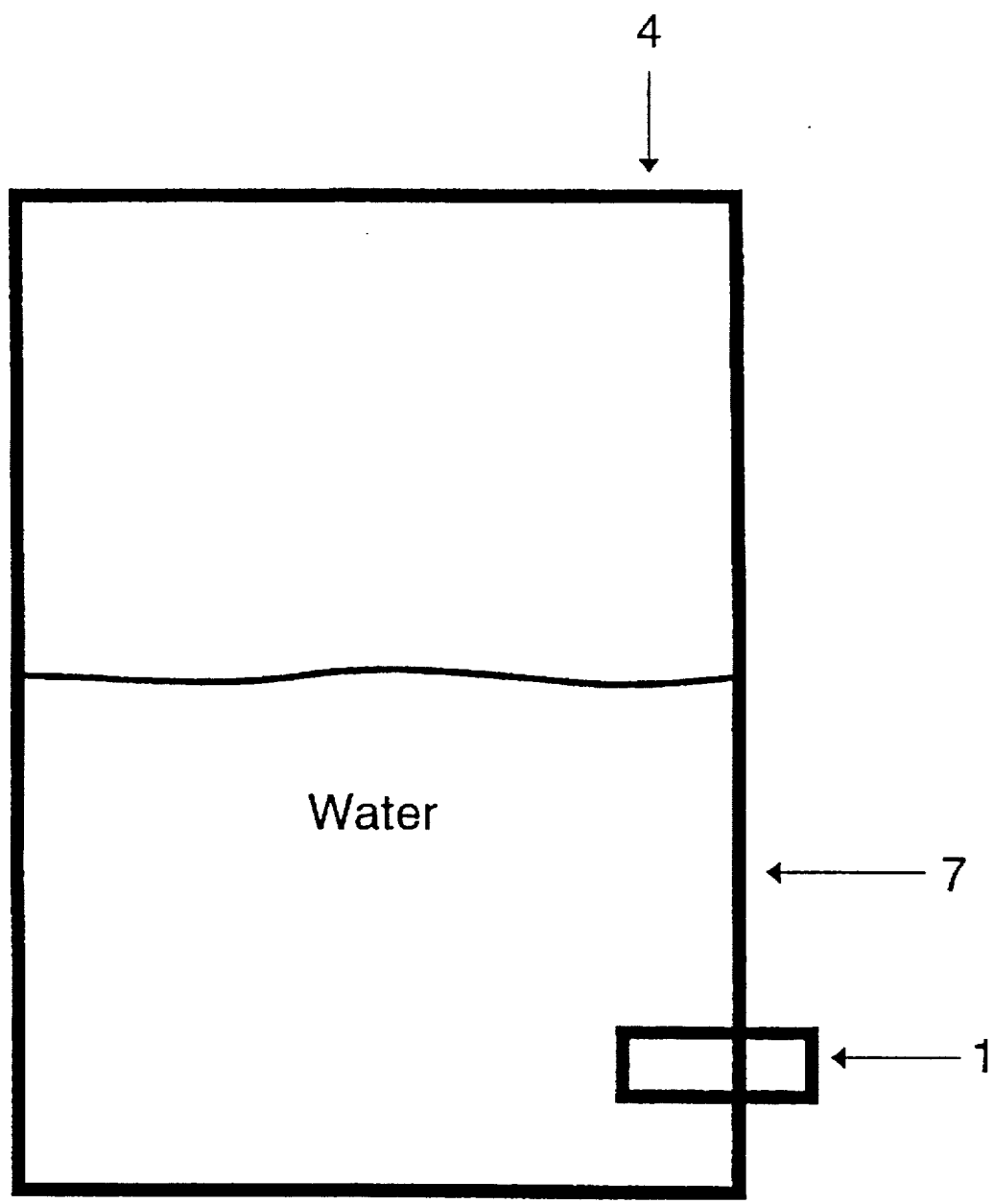
FIG. 2 is a side view of the present invention.
Figure 3:
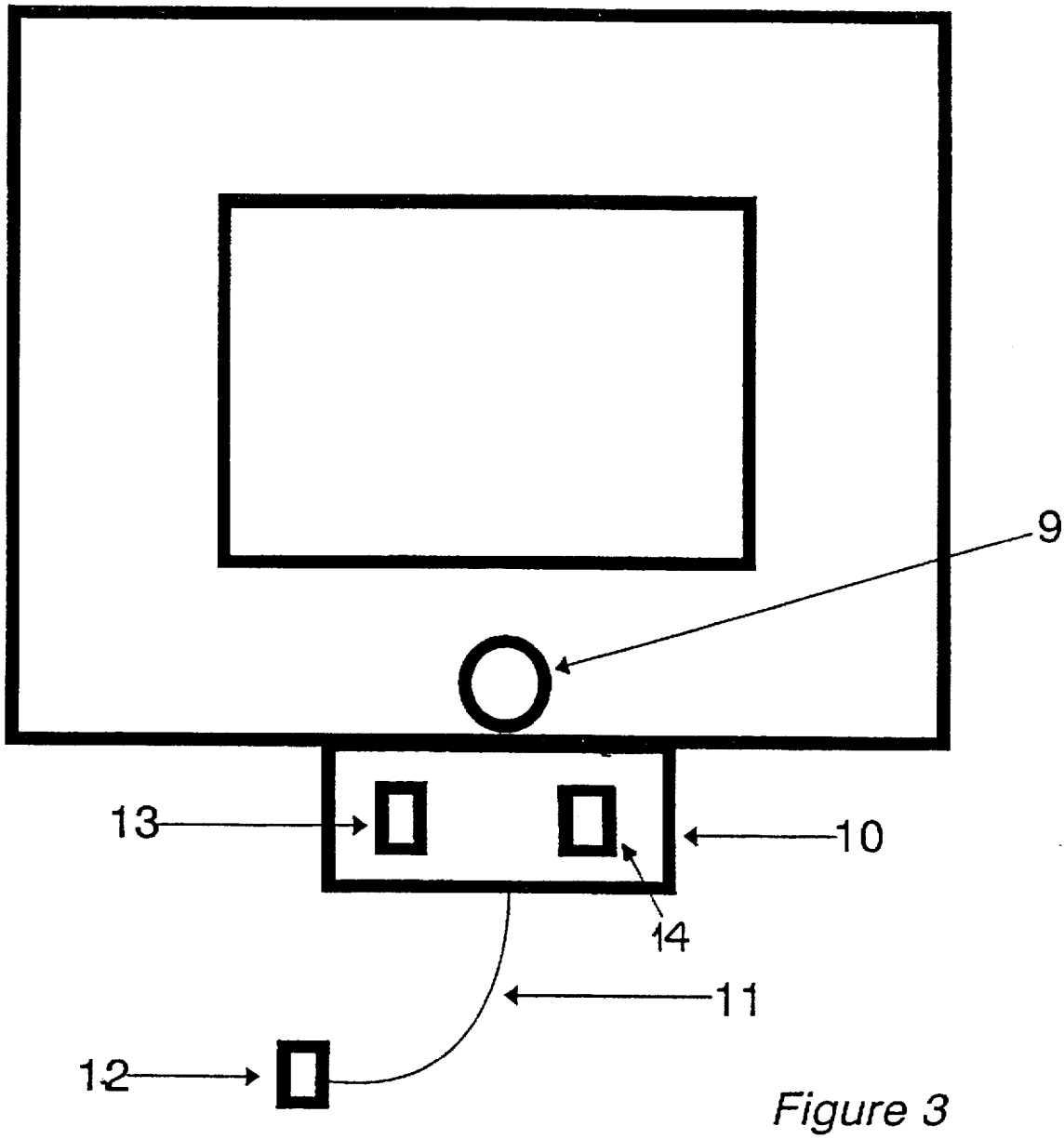
FIG. 3 is an overhead view of the present invention.

In the disclosed embodiment of the present invention, FIG. 1 shows a frontal view of the present invention which includes an electrically nonconductive container 7. Preferably, the container 7 is constructed of heavy-duty, commercial standard plastic ensuring that the container is durable as well as electrically nonconductive and safe. An electrolyte solution such as water is contained within the container 7 and a drain plug 1, shown in FIG. 2, is located at the bottom of the container 7 to provide means for draining the electrolyte solution out of the container. The drain plug 1 may be a screw-type plug and is also preferably made of heavy-duty plastic. As also shown in FIG. 2, the container 7 may be covered by a lid or top 4 preferably made of heavy-duty plastic. As a safety precaution, the inventive apparatus is activated for processing one or more hard shell crabs when the top or lid 4 closes the container 7. A safety switch 9, shown in FIG. 3, is positioned in the container 7 and allows for the electricity to be shut off when the lid 4 is ajar. When the lid 4 is in place, the switch 9 is closed.

Located inside the container 7 is shocking means comprising electrodes 6 and 8 that are each preferably constructed of stainless steel tubing or other electrically conductive material, thus providing the electrical connection for the electrodes 6 and 8, respectively. Standard utility, coated electric wires 2 are inserted through the nonconductive container 7 to provide current to the metal rods 5 via interconnecting electric wires 3.

As shown in FIG. 3, an electric connector box 10 is preferably constructed of heavy-duty commercial plastic, assuring that the connector box 10 is electrically nonconductive. Contained within the electric connector box 10 is an electric switch 14 and timer 13. An electric cord 11 and plug 12 operate to provide pulsating alternating 110 V.A.C. current to the switch 14 and timer 13. The electric cord 11 may be a standard electrical cord that connects the apparatus to the electrical plug 12 which may also be a standard plug connecting the apparatus with 110 volts AC of household current. The switch 14, which functions in the standard "On" or "Off" positions, enables the operator of the apparatus to activate the electric power from the source 12 to the electrodes 6 and 8. The switch 14 and timer 13 also allow the operator of the apparatus to select the length of time that the standard household current of 110 volts AC will flow through the electrodes 6 and 8.

Figure 4:
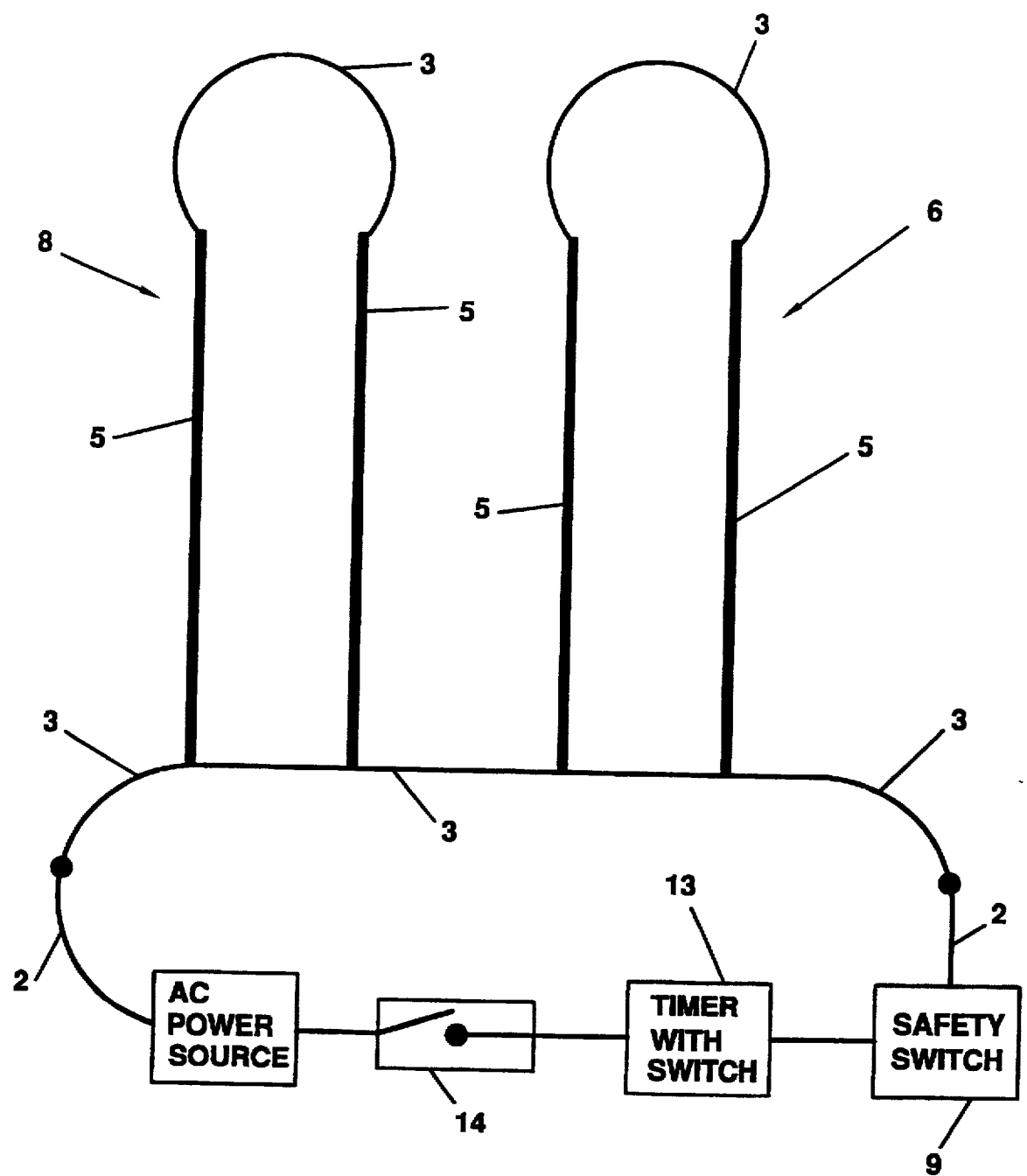
FIG. 4 is a schematic representation of the electrical circuitry of the present invention.

FIG. 4 shows a schematic representation of the electrical circuit of the present invention. As shown in FIG. 4, the timer 13 is in series between the switch 14 and electrodes 6 and 8. When the switch 14 is first closed, the circuit is closed and electricity flows through the electrodes 6 and 8. When the time period preset on the timer 13 has elapsed, a switch (not shown) in the timer 14 opens, thereby opening the circuit.

The above-described embodiment of the present invention operates as follows. Initially, the container 7 is partially filled with an electrolyte solution such as water. One or more live hard shell crabs to be processed are deposited in the container 7 and immersed in the electrolyte solution. Lid or top 4 is positioned to close the container 7 and activate (close) the safety switch 9. The operator then sets the timer 13 for the desired immobilization period, for example, 30 seconds, and moves the switch 13 to the "On" position to supply an electric power source from the electrical outlet 12 to the electrodes 6 and 8. The electrolyte solution transfers this electric energy to the live hard shell crabs directly from each electrode causing them to be electrically shocked and consequently immobilized. This arrangement will allow one bushel of live hard shell crabs to be immobilized in approximately 30 seconds.

The embodiment of the present invention herein is intended merely to be exemplary and those skilled in the art will be able to make numerous variations and modifications to it without departing from the intended spirit and scope of the present invention. All such variations and modifications are intended to be within the scope of the present invention as defined by the claims appended hereto.

I claim:

1. An apparatus for the immobilization of one or more live crustaceans comprising:
   a) a container containing an electrolyte solution, quantity of said electrolyte solution being sufficient to submerge at least one crustacean to be processed;
   b) shocking means for immobilizing said crustacean including at least one electrode positioned within the container and being at least partially covered by the electrolyte solution;
   c) said at least one electrode being connected into an electrical circuit connected to a source of electrical power;
   d) activation means incorporated into said circuit for allowing an operator to activate the apparatus, whereby the electrical energy supplied to the at least one electrode is transferred via the electrolyte solution to a submerged crustacean for immobilization.

2. An apparatus for the immobilization of live hard shell crabs as set forth in claim 1, further comprising:
   a) a lid for covering an opening in the container;
   b) a safety switch positioned in said container adjacent the opening and in association with the lid for causing the electric power to the at least one electrode to be shut off when the lid is ajar.

3. An apparatus for the immobilization of live hard shell crabs as set forth in claim 1, further comprising:
   a) a timer incorporated with the activation means for allowing an operator of the apparatus to select the length of time that the electrical power will flow between the at least one electrode for stunning the submerged crabs.

4. An apparatus for the immobilization of live hard shell crabs as set forth in claim 1, further comprising:
   a) a drain plug located in the bottom of the nonconductive container to provide means for draining the electrolyte solution out of said container.

5. An apparatus for the immobilization of live hard shell crabs as set forth in claim 1, further wherein said at least one electrode comprises a pair of spaced rods.

6. An apparatus for the immobilization of live hard shell crabs as set forth in claim 5, wherein said spaced rods are parallel.

7. An apparatus for the immobilization of live hard shell crabs as set forth in claim 3, further including an electrical connector box attached to said container and containing said activation means and timer, said activation means comprising an electric switch.

8. An apparatus for the immobilization of live hard shell crabs as set forth in claim 5, further including an electric conductor electrically interconnecting said spaced rods.

9. An apparatus for the immobilization of live hard shell crabs as set forth in claim 1, wherein said container is nonconductive.

10. An apparatus for the immobilization of live hard shell crabs as set forth in claim 9, wherein said container is made of plastic.

11. An apparatus for the immobilization of live hard shell crabs as set forth in claim 5, further wherein said at least one electrode comprises a first electrode and further including a second electrode including a pair of spaced, parallel serially electrically interconnected parallel rods.

12. An apparatus for the immobilization of one or more crustaceans, comprising:
   a) a nonconductive container containing an electrolyte solution, quantity of said electrolyte solution being sufficient to submerge one or more crustaceans to be processed;
   b) first and second electrodes positioned in spaced relationship within the container and being at least substantially covered by the electrolyte solution, each of said electrodes comprising a pair of metal rods projecting vertically from the bottom of the container;
   c) an electric wire extending inside said container for electrically interconnecting the electrodes;
   d) said electrodes being connected to a source of electrical power;
   e) an electric connector box outside the container;
   f) an electric switch means contained in the connector box, said switch means being electrically connected between said electrodes and an electrical power source for allowing an operator to activate the apparatus, whereby electrical energy supplied to the electrodes is transferred via the electrolyte solution to one or more submerged crustaceans for their immobilization.

13. An apparatus for the immobilization of live hard shell crabs as set forth in claim 12, further comprising:

a) a timer incorporated with the electric switch means for allowing an operator of the apparatus to select the length of time that the electrical power will flow between the electrodes for stunning the submerged crabs.

14. An apparatus for the immobilization of live hard shell crabs as set forth in claim 12, further comprising:

a) a drain plug located in the bottom of the nonconductive container to provide means for draining the electrolyte solution out of said container.

15. An apparatus for the immobilization of live hard shell crabs as set forth in claim 12, wherein said spaced rods are parallel.

16. An apparatus for the immobilization of live hard shell crabs as set forth in claim 12, wherein said electrical connector box is attached to said container.

17. An apparatus for the immobilization of live hard shell crabs as set forth in claim 12, wherein said container is made of plastic.

* * * * *